United States Patent [19]

Edamura et al.

[11] Patent Number: 5,695,678
[45] Date of Patent: Dec. 9, 1997

[54] ELECTRORHEOLOGICAL FLUID COMPOSITION CONTAINING INORGANIC/ORGANIC COMPOSITE PARTICLES

[75] Inventors: Kazuya Edamura, Tokyo; Yasufumi Otsubo, Chiba; Masataka Mizoguchi, Tokyo, all of Japan

[73] Assignee: Fujikura Kasei Co., Ltd., Tokyo, Japan

[21] Appl. No.: 594,329

[22] Filed: Jan. 30, 1996

Related U.S. Application Data

[63] Continuation of Ser. No. 293,111, Aug. 19, 1994, abandoned, which is a continuation of Ser. No. 35,361, Mar. 22, 1993, abandoned.

[30] Foreign Application Priority Data

| Mar. 23, 1992 | [JP] | Japan | 4-065021 |
| Aug. 11, 1992 | [JP] | Japan | 4-214394 |

[51] Int. Cl.$^6$ ............... C10M 171/00; C10M 169/04
[52] U.S. Cl. ................. 252/74; 252/75; 252/76; 252/572
[58] Field of Search ................. 252/74, 572, 75, 252/76

[56] References Cited

U.S. PATENT DOCUMENTS

| 3,428,514 | 2/1969 | Greer et al. |
| 5,271,858 | 12/1993 | Clough et al. ............... 252/74 |

FOREIGN PATENT DOCUMENTS

| 0394049 | 10/1990 | European Pat. Off. |
| 63-97694 | 4/1988 | Japan |
| 64-6093 | 1/1989 | Japan |
| 64-17404 | 1/1989 | Japan |
| 2-91194 | 3/1990 | Japan |
| 2-235994 | 9/1990 | Japan |
| 3-162494 | 7/1991 | Japan |
| 3-200897 | 9/1991 | Japan |

OTHER PUBLICATIONS

Chemical Abstracts, vol. 96, No. 6, Abs. No. 41469k, Feb. 8, 1982.

Contributed Original Research, Journal of Applied Physics, vol. 20, Dec. 1949, 'Induced Fibration of Suspensions'.

*Primary Examiner*—Christine Skane
*Attorney, Agent, or Firm*—Finnegan, Henderson, Farabow, Garrett & Dunner, L.L.P.

[57] ABSTRACT

An electrorheological fluid which possesses high electrorheological effects, has superior storage stability and longevity, does not damage instrumentation, is unaffected by ambient temperature or humidity, has stable current values, and low power consumption, is disclosed. In the electrorheological fluid, inorganic/organic composite particles comprising a core comprising inorganic polymeric compound, and a shell comprising an inorganic material particle possessing electrorheological properties, are dispersed in an electrically insulating medium. The surfaces of these inorganic/organic composite particles may be polished, and furthermore, the inorganic/organic composite particles are preferably produced by means of a method in which the core and the shell are formed simultaneously.

9 Claims, 1 Drawing Sheet

ELECTRORHEOLOGICAL FLUID COMPOSITION CONTAINING INORGANIC/ ORGANIC COMPOSITE PARTICLES

This application is a continuation of application Ser. No. 08/293,111 filed Aug. 19, 1994, now abandoned, which is a continuation of application Ser. No. 08/035,361 filed Mar. 22, 1993, now abandoned.

BACKGROUND OF THE INVENTION

1. Field of the Invention

The present invention relates to an electrorheological fluid, and in particular, relates to an electrorheological fluid which stably generates large resistance to shearing flow by means of the application of an external electric field, and which can be used, for example, in instruments for braking or for power transmission, such as clutches, dampers, shock absorbers, valves, actuators, vibrators, printers, vibrating devices or the like.

2. Background Art

Electrorheological fluids (hereinbelow referred to as "ER fluids") are fluids which are obtained by dispersing specified solid particles in a medium having electric insulation properties, and normally exhibit fluidity; however, when an external electric field is applied thereto, the viscosity thereof increases markedly, and in certain cases, such a liquid may even solidify. That is to say, such liquids possess electrotheological effects (hereinbelow referred to as "ER effects").

This ER effect is also termed a "Winslow Effect"; an ER fluid in which silica gel was dispersed in paraffin and a small amount of water was added to this dispersion fluid was studied by Winslow (W. H. Winslow, J. Applied Physics, 20, 1137 (1949)). This ER effect is thought to be produced by the polarization of the solid particles dispersed in the ER fluid by means of the action of the electric field produced between electrodes when voltage is applied to an ER fluid disposed between these electrodes, and by the alignment and bridging of the solid particles in the direction of the electric field by means of electrostatic attraction based on this polarization. As a result of this, the viscosity of the fluid increases, and the resistance (hereinbelow referred to as the "shearing resistance") to flow in a direction perpendicular to the direction of alignment of the particles (shearing flow) is also greatly increased. That is to say, by means of the on/off state of the electric power, it is possible to instantaneously change the viscosity and shearing resistance of these ER fluids.

Accordingly, it is expected that such ER fluids possessing ER effects will find applications as fluids for braking or power transmission in apparatuses operating by means of electric control, such as clutches, dampers, shock absorbers, valves, actuators, vibrators, printers, vibrating devices, or the like.

Conventionally, ER fluids were generally known in which solid particles having surfaces which adsorbed and retained water such as silica gel particles, cellulose particles, starch particles, casein particles, or polystyrene-type ion exchange resin particles or the like were dispersed in electrically insulating oils such as silicone oil, diphenyl chloride, transformer oil, or the like.

However, the ER effect of such ER fluids was small, so that in order to obtain practically strong shearing resistance, it was necessary to apply a high voltage, and as a result of this, the apparatus was large in size and the amount of power consumed was large. Furthermore, when the water which was adsorbed at the surface of the solid particles was desorbed or evaporated or the water content of the particles changed, this created a problem in that the conductivity of the solid particles changed, and current flowed abnormally, and in addition, a problem was caused in that the electrorheological characteristics of these ER fluids changed as a result of the influence of the environment in which they were used, for example, as a result of temperature or humidity. Furthermore, there were problems in that the storage stability of these fluids was poor, and the solid particles tended to migrate to one electrode and to condense thereon.

Furthermore, an ER fluid (Japanese Laid-Open Patent Application No. Hei 2-91194) was disclosed in which inorganic solid particles incorporating semiconductors and having low electric conductivity were used as the solid particles; and an ER fluid was disclosed (Japanese Laid-Open Patent Application No. Hei 3-200897) in which inorganic ion exchange particles comprising hydroxides of polyvalent metals, hydrotalcites, acid salts of polyvalent metals, hydroxyapatite, Nasicon (Na ion superionic conductor)-type compounds, clay minerals, potassium titanates, heteropolyacid salts, or insoluble ferrocyanides were used as the solid particles.

However, the differences in specific gravities between such inorganic solid particles and the electrically insulating oils which were used as the dispersion medium was large, so that when such liquid was stored for a long period of time, the particles were precipitated, and the particles which were thus precipitated cohered to such an extent that they were not easily redispersed in the medium, and thus the storage stability of these fluids was poor. Furthermore, as these inorganic solid particles were extremely hard, when such particles collided with the electrodes which were used for the application of voltage or with the walls of apparatuses, they were abraded and damaged by the particles, and furthermore, the fragments which were scraped off by these collisions and were suspended in the ER fluid altered the ER characteristics, causing problems in that large, abnormal currents would suddenly flow.

In addition, in particular in the case in which inorganic ion exchange particles were used which had a large electric conductivity, when the fluids made contact with the electrodes, a very large current flowed to the ER fluid and abnormal heating occurred, and this was undesirable in that it consumed an extremely large amount of electric power.

In addition, a fluid was disclosed (Japanese Laid-Open Patent Application No. Hei 3-162494) which used, as the solid particles, particles which were obtained by using a material having a specific gravity of less than 1.2 as a core, and then covering this core material with an organic polymeric compound having an anion group or a cation group which was dissociable in water. However, in this case, as the particles were water-bearing, when the water content of the particles changed as a result of the influence of the temperature of the environment in which they were used, the electric conductivity and polarization percentage of the liquid changed, and as a result thereof, the problem of the change in the ER characteristics thereof still remained.

SUMMARY OF THE INVENTION

It is an object of the present invention to provide an electrorheological fluid which possesses superior ER characteristics, possesses superior storage stability and durability, causes little damage to apparatuses, exhibits stable characteristics without suffering from the influence of environmental temperature or humidity, and which furthermore consumes little power.

The electrorheological fluid of the present invention is obtained by dispersing inorganic/organic composite particles comprising a core comprising organic polymeric compounds and a shell comprising an inorganic material possessing electrorheological properties, in an electrically insulating medium.

Furthermore, the electrorheological fluid of the present invention is obtained by dispersing, in an electrically insulating medium, inorganic/organic composite particles formed by the use of a core comprising organic polymeric compound, and a shell comprising an inorganic material possessing electrorheological properties; furthermore, the surface of these inorganic/organic composite particles are polished.

Here, the inorganic material (hereinbelow referred to as "ER inorganic material") possessing electrorheological effects which forms the shell of the above-described inorganic/organic composite particles is an inorganic material such as inorganic ion exchanger or silica gel or the like which exhibits ER effects when the solid particles thereof are dispersed in an electrically insulating medium. This type of strong ER inorganic material forms the shell on the core comprising organic polymeric compound, so that the ER fluid of the present invention which uses such inorganic/organic composite particles generates a large shearing resistance even in response to a low applied voltage.

In addition, the core of these inorganic/organic composite particles comprises organic polymeric compound which has a small specific gravity and is insulating, so that even in the case in which the specific gravity of the ER inorganic material forming the shell is high and the electric conductivity is large, by means of adjusting the ratio of the core to the shell, it is possible to adjust the specific gravity and the electric conductivity of the particles as a whole, and by means of this, it is possible to prevent the precipitation of the ER fluid, and the abnormal heating and electric power consumption at the time of voltage application.

Furthermore, the core of these inorganic/organic composite particles is comprising soft organic polymeric compound, so that even though the particles have shells comprising hard inorganic material, the particles possess overall softness, so that they will not damage electrodes or apparatus walls.

In the case in which nonaqueous inorganic ion exchanger is used as the ER inorganic material, the polarity of the inorganic/organic composite particles does not depend on the water content thereof, so that even if the temperature of the system is increased during use and the water content thus changes, it is possible to stably maintain the ER characteristics of the fluid.

In addition, the inorganic/organic compound particles of the present invention should preferably be manufactured by means of a method in which the cores and the shells are simultaneously formed. Particles which are manufactured in this manner have a strong bond between the core and the shell, so that shells will not be stripped away as a result of contact and the like during use, and the characteristics of the fluid will not thus change, so that the durability thereof is high.

In addition, the ER fluid of the present invention is obtained by dispersing, in an electrically insulating medium, inorganic/organic composite particles which are obtained by the formation of cores comprising inorganic polymeric compound and shells comprising inorganic material possessing electrorheological effects, the surfaces of which particles are polished. Thus, impurities which may attach to the surface of the particles, for example, in a particle manufacture process, are removed, so that a high ER effect is exhibited.

DETAILED DESCRIPTION OF THE INVENTION

The electrorheological fluid of the present invention is formed by dispersing, in an electrically insulating medium, inorganic/organic composite particles comprising a core comprising organic polymeric compound and a shell comprising inorganic ion exchanger.

Figure 1:
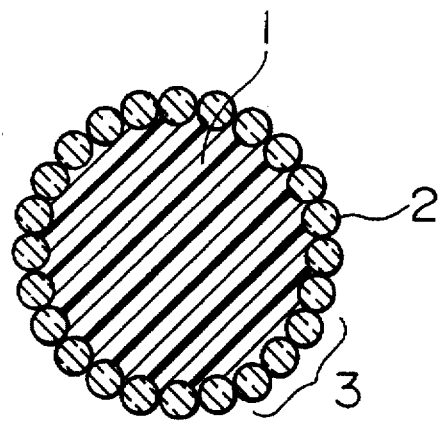
FIG. 1 is a schematic cross-sectional diagram showing the structure of the inorganic/organic composite particles used in the electrorheological fluid of the present invention.

The inorganic/organic composite particles used in the electrorheological fluid of the present invention are comprising a core comprising organic polymeric compound and a shell comprising ER inorganic material; that is to say, as shown in FIG. 1, a microparticle 2 comprising ER inorganic material is deposited in the form of a shell on the surface of a core 1 comprising organic polymeric compound, and a shell 3 is formed. Inorganic/organic composite particles having this type of structure are dispersed in an electrically insulating medium, and the electrorheological fluid of the present invention is thus formed.

Figure 2:
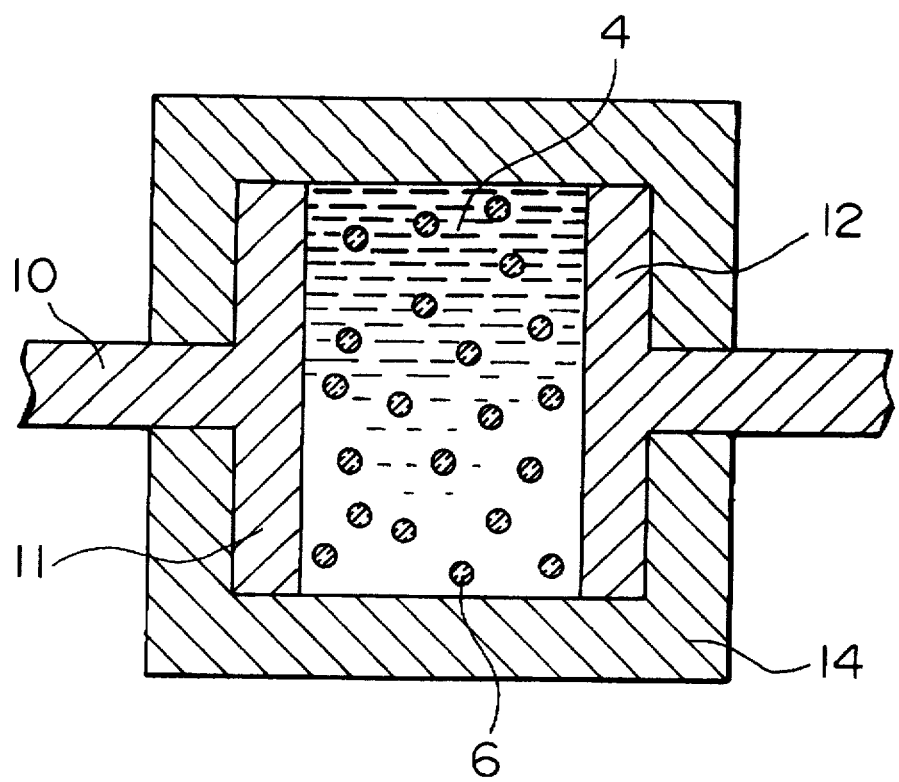
FIG. 2 is a schematic cross-sectional diagram showing a clutch in which the electrorheological fluid of the present invention is used as a power transmission fluid.

FIG. 2 shows a preferred embodiment of the ER fluid of the present invention; a clutch utilizing the ER fluid of the present invention as a power transmission fluid is shown as an example. Reference numeral 4 in the diagram indicates the ER fluid of the present invention; clutch case 14 is filled therewith. Within this clutch case 14, a clutch plate 11, which is on the engine side, and a clutch plate 12, which is on the vehicle axis side, both of which are disk-shaped, are disposed. And an axle 10 is provided integrally in the center of the clutch plate 11. Furthermore, the engine side clutch plate 11 rotates about the axle 10.

Normally, ER fluid 4 is in a state in which the inorganic/organic composite particles 6 are randomly dispersed within electrically insulating medium, and thus possesses fluidity. Accordingly, clutch plate 11 rotates freely within this fluid, and this rotation is not transmitted to the other clutch plate 12.

However, when voltage is applied between these two clutch plates 11 and 12, the inorganic/organic composite particles 6 within the ER fluid are polarized, and are aligned and bridged in the direction of the applied electric field; that is to say, they are aligned and bridged in a direction perpendicular to both clutch plates. Along with this, the viscosity of the ER fluid increases, and the shearing resistance between the clutch plates is increased. In the ER fluid of the present invention, the shearing resistance is large, and exceeds the force at which clutch plate 11 rotates, so that vehicle axle side clutch plate 12 also rotates in concert with the engine side clutch plate 11. That is to say, both axles become firmly bonded, and the rotation of the engine side clutch plate is transmitted to the vehicle side clutch plate.

Hereinbelow, the each component comprising the ER fluid of the present invention will be explained.

Examples of the organic polymeric compound which is used in the core of the inorganic/organic composite particles include 1 or a mixture or copolymer of two or more of, for example, poly(meth)acrylic ester, (meth)acrylic ester-styrene copolymer, polystyrene, polyethylene, polypropylene, nitrile rubber, butyl rubber, ABS resin, nylon, polyvinyl butylate, ionomer, ethylene-vinyl acetate copolymer, vinyl acetate resin, polycarbonate resin, or the like.

It is preferable to use inorganic ion exchanger or silica gel as the ER inorganic material which is used as the shell of the inorganic/organic composite particles. These produce superior electrorheological effects when the solid particles are dispersed in an electrically insulating medium.

Examples of inorganic ion exchangers include: (1) hydroxides of polyvalent metals, (2) hydrotalcites, (3) acid salts of polyvalent metals, (4) hydroxyapatites, (5) Nasicon-type compounds, (6) clay minerals, (7) potassium titanates, (8) heteropoly-acid salts, and (9) insoluble ferrocyanides.

Hereinbelow, detailed explanation will be given with respect to these various inorganic ion exchangers.

(1) Hydroxides of polyvalent metals

These compounds are represented by the general formula $MO_x(OH)_y$, (where M represents a polyvalent metal, x represents a number having a value of 0 or greater, and y represents a positive number); for example, titanium hydroxide, zirconium hydroxide, bismuth hydroxide, tin hydroxide, lead hydroxide, ammonium hydroxide, tantalum hydroxide, niobium hydroxide, molybdenum hydroxide, magnesium hydroxide, manganese hydroxide, iron hydroxide, and the like.

Here, for example, titanium hydroxide encompasses both titanium hydroxide dihydroxide (also called metatitanic acid or β-titanic acid, $TiO(OH)_2$) and titanium hydroxide (also called orthotitanic acid or α-titanic acid, $Ti(OH)_4$); this is also true for the other compounds.

(2) Hydrotalcites

These compounds are represented by the general formula $M_{13}Al_6(OH)_{43}(Co)_3 \cdot 12H_2O$ (where M represents a bivalent metal). Examples of this bivalent metal M include Mg, Ca, Ni, and the like.

(3) Acid salts of polyvalent metals

Examples hereof include titanium phosphate, zirconium phosphate, tin phosphate, cerium phosphate, chromium phosphate, zirconium arsenate, titanium arsenate, tin arsenate, cerium arsenate, titanium antimonate, tin antimonate, tantalum antimonate, niobium antimonate, zirconium tungstate, titanium vanadate, zirconium molybdate, titanium selenate, tin molybdate, and the like.

(4) Hydroxyapatites

These include, for example, calcium apatite, lead apatite, strontium apatite, cadmium apatite, and the like.

(5) Nasicon-type compounds

Examples hereof include compounds such as $(H_3O)Zr_2(PO_4)_3$; however, in the present invention, it is also possible to use a Nasicon-type compound in which $H_3O$ has been replaced by Na.

(6) Clay minerals

These include, for example, montmorillonite, sepiolite, bentonite, and the like; sepiolite is particularly preferable.

(7) Potassium titanates

These are represented by the general formula $aK_2O \cdot bTiO_2 \cdot nH_2O$ (where a represents a positive number such that $0 < a \leq 1$; b represents a positive number such that $1 \leq b \leq 6$; and n represents a positive number); for example, $K_2O \cdot TiO_2 \cdot 2H_2O$, $K_2O \cdot 2TiO_2 \cdot 2H_2O$, $0.5K_2O \cdot TiO_2 \cdot 2H_2O$, $K_2O \cdot 2.5TiO_2 \cdot 2H_2O$, and the like.

Among the above compounds, compounds in which a or b are not integers can be easily synthesized by acid treatment of a compound in which a or b are appropriate integers.

(8) Heteropoly-acid salts

These are represented by the general formula $H_3AE_{12}O_{40} \cdot nH_2O$ (where A represents phosphorus, arsenic, germanium, or silicon; E represents molybdenum, tungsten, or vanadium; and n represents a positive number); for example, these include ammonium molybdophosphate, and ammonium tungstophosphate.

(9) Insoluble ferrocyanides

These are represented by the following general formula: $M_{(b-pxa)}A[E(CN)_6]$ (where M represents an alkali metal or a hydrogen ion; A represents a heavy metal ion such as zinc, copper, nickel, cobalt, manganese, cadmium, iron (III), titanium, or the like; E represents iron (II), iron (III), cobalt (II), or the like; b represents 4 or 3; a represents the valence number of A; and p represents a positive number within the range of 0–b/a).

Included in this are, for example, insoluble ferrocyanides such as $Cs_2Zn[Fe(CN)_6]$, $K_2Co[Fe(CN)_6]$, and the like.

The inorganic ion exchangers (1)–(6) described above all possess OH groups, and exchangers (hereinbelow termed "substitutional inorganic ion exchangers"), which have a portion or all of the ions at the ion exchange site of the inorganic ion exchanger substituted with other ions, are also included in the inorganic ion exchanger in accordance with the present invention.

That is to say, when the above described inorganic ion exchangers are represented by the formula R—$M^1$ ($M^1$ represents the ions of the ion exchange site), substitutional inorganic ion exchangers in which a portion or all of $M^1$ in R—$M^1$ has been substituted with ions $M^2$, differing from $M^1$ by means of the ion exchange reaction described hereinbelow, can also be used as the inorganic ion exchanger in accordance with the present invention.

(Here, x and y represent the valence numbers of ion $M^2$ and $M^1$, respectively.)

$M^1$ differs based on the type of inorganic ion exchanger containing an OH group; however, in inorganic ion exchangers which exhibit an ability to exchange cations, $M^1$ is typically $H^+$, and in this case, $M^2$ represents a freely selected metal ion other than $H^+$, such as an alkali metal ion, alkali earth metal ion, polyvalent typical species metal ion, transition metal ion, rare earth metal ion or the like.

In inorganic ion exchangers possessing OH groups which exhibit an ability to exchange anions, $M^1$ represents, in general, $OH^-$, and in this case, $M^2$ represents an anion freely selected from all anions other than $OH^-$, such as, for example, I, Cl, SCN, $NO_2$, Br, F, $CH_3COO$, $SO_4$, $CrO_4$, or the like, or a complex ion.

Furthermore, with respect to inorganic ion exchangers which have lost their OH groups as a result of a high temperature heating process, but have reacquired OH groups by means of immersion in water or the like, such post-high temperature heating process inorganic ion exchangers also represent a type of inorganic ion exchanger which may be used in the present invention; concrete examples thereof include Nasicon-type compounds, for example, $HZr_2(PO_4)_3$, which is produced by means of heating $(H_3O)Zr_2(PO_4)_3$, and high temperature heat-processed hydrotalcite materials (heat processed at a temperature within a range of 500°–700° C.), and the like.

It is possible to use not merely one type of such inorganic ion exchangers, but rather to utilize a plurality of types simultaneously in the shells.

In order to sufficiently produce the effects particular to this invention, it is particularly preferable to use hydroxides of polyvalent metals and acid salts of polyvalent metals as the above-described inorganic ion exchanger.

The silica gel which is used as the shell of the inorganic/organic composite particles is a compound represented by the formula $SiO_2 \cdot nH_2O$, and the water content thereof changes as a result of the equilibrium water vapor pressure; however, such silica gel can be used in the electrorheological fluid of the present invention irrespective of water content. Furthermore, in the electrorheological fluid in accordance with the present invention, it has been determined by experiment that the ER effects thereof are independent of the water content of the silica gel.

This type of inorganic/organic composite particle can be produced according to various methods.

For example, a method is known in which core particles 1 comprising organic polymeric compound and microparticles 2 comprising ER inorganic material are blown in a jet stream and caused to collide. In such a case, the ER inorganic material microparticles 2 collide with the surface of the core particles 1 at high speed, adhere thereto, and form shells 3.

Furthermore, a different method is known in which core particles 1 are suspended in a gas, and an ER inorganic material solution in spray form is sprayed onto the surfaces thereof. In this case, the solution is deposited on the surfaces of core particles 1 and is dried, and thereby shells 3 are formed.

However, the preferable method for the manufacture of these inorganic/organic composite particles is one in which core 1 and shell 3 are simultaneously formed.

In such a method, for example, when the organic polymeric compound monomer forming core 1 is subjected to emulsion polymerization, suspension polymerization, or dispersion polymerization in a polymerization medium, the ER inorganic material microparticles 2 are placed in the above-described monomer or in the polymerization medium.

Water is preferable as the polymerization medium; however, it is also possible to use a mixture of water and a water soluble organic solvent, or to use an organic poor solvent.

In accordance with such a method, the monomer in the polymerization medium is polymerized and forms core particles 1, and simultaneously therewith, the ER inorganic material microparticles 2 cover the surfaces of core particles 1 in a layered manner, thus forming shells 3.

In the case in which inorganic/organic composite particles are produced by means of emulsion polymerization or suspension polymerization, by means of combining the hydrophobic characteristics of the monomer and the hydrophilic characteristics of the ER inorganic material, it is possible to orient the majority of the ER inorganic material microparticles on the surface of the core particles.

By means of this method in which core 1 and shell 3 are simultaneously formed, the ER inorganic material particles 2 are minutely and strongly attached to the surface of the core particles 1 comprising organic polymeric compound, and thus durable inorganic/organic composite particles are formed.

The shape of the inorganic/organic composite particles used in the present invention is not necessarily limited to a spherical shape; however, in the case in which the core particles are manufactured by means of a regulated emulsion or suspension polymerization method, the form of the inorganic/organic composite particles which are obtained is almost completely spherical.

The particle diameter of the inorganic/organic composite particles is not particularly restricted; however, a range of 0.1–500 μm, and in particular, a range of 5–200 μm is preferable.

The particle diameter of the ER inorganic microparticles 2 is not particularly restricted; however, a range of 0.005–100 μm is preferable, and a range of 0.01–10 μm is still more preferable.

In this type of inorganic/organic composite particle, the weight ratio of the ER inorganic material forming shells 3 and the organic polymeric compound forming cores 1 is not particularly restricted; however, it is preferable that the ratio (ER inorganic material):(organic polymeric compound) be within a range of 1:99–60:40, and it is still further preferable that it be in a range of 4:96–30:70. If the weight ratio of the ER inorganic material is less than 1%, the ER effects of the ER fluid which is obtained will be insufficient, while when this weight ratio exceeds 60%, a current which is too large will flow in the fluid which is obtained.

It has become clear through analysis that if a portion or the entirety of the shells 3 of inorganic/organic composite particles produced by means of one of the various methods described above, or in particular, by a method in which the cores 1 and shells 3 are simultaneously formed, is covered by a thin layer of organic polymeric material or an additive used in the process of manufacturing, such as dispersants, emulsifiers, or the like, the ER effects of the ER inorganic microparticles cannot be sufficiently exhibited. This type of thin layer of inactive material can be removed by means of polishing the surfaces of the particles.

The polishing of the particle surfaces can be accomplished by a variety of methods.

For example, it is possible to conduct this polishing by means of dispersing the inorganic/organic composite particles in a dispersion medium such as water or the like, and by agitating this. At this time, it is possible to conduct this polishing by means of a method in which a polishing material such as grains of sand or balls is mixed into the dispersion medium and is agitated along with the inorganic/organic composite particles, or by means of a method in which agitation is conducted using a grinding stone.

Furthermore, it is possible to conduct agitation without the use of a dispersion medium by employing a dry process using the inorganic/organic composite particles and a polishing material or grinding stone such as those described above.

A more preferable polishing method is a method in which the inorganic/organic composite particles are subjected to jetstream-blown agitation in a jet air stream or the like. In this method, the particles themselves collide violently with one another in the gas and are thus polished, so that other polishing material is unnecessary, and the inactive materials which are separated from the particle surfaces can be easily separated by means of classification, so that such a method is preferable.

In the above jetstream blown agitation, it is difficult to specify the type of apparatus employed, the agitation speed, and polishing conditions, as a result of the qualities of the inorganic/organic composite particles; however, in general, an agitation speed of 6,000 rpm and a jetstream-blown agitation time of 0.5–15 minutes are preferable.

In the case in which the inorganic/organic composite particles are manufactured by a method in which the above-described shells 3 are formed after the formation of cores 1, no inactive material will be present on the surface of shells 3, and the ER effects of the inorganic ion exchanger will be sufficient, so that polishing will not necessarily be required.

It is possible to produce the electrorheological fluid of the present invention by agitating and mixing the above-described inorganic/organic composite particles uniformly in an electrically insulating medium, and where necessary, together with other components such as dispersants or the like.

Any agitator which is normally used for dispersing solid particles in a liquid dispersion medium may be used as an agitator for this purpose.

The percentage of inorganic/organic composite particles in the electrorheological fluid of the present invention is not particularly restricted; however, a range of 1–75 wt % is preferable, and in particular, a range of 10–60 wt % is more preferable. When the percentage contained thereof is less than 1%, a sufficient ER effect cannot be obtained, while when the percentage contained is more than 75%, the initial viscosity of the components when a voltage is not applied is too great, so that use thereof is difficult.

All electrically insulating media which were used in conventional ER fluids may be used as the electrically insulating medium of the present invention. For example, any fluid may be used which has high electric insulation and electric insulation breakdown strength, is chemically stable, and in which the inorganic/organic composite particles may be stably dispersed. Examples thereof include diphenyl chloride, butyl sebacate, aromatic polycarbonate higher alcohol ester, halophenyl alkyl ether, transformer oil, paraffin chloride, fluorine-contained oil, silicone-contained oil, or the like. Furthermore, mixtures thereof may be used.

Furthermore, it is possible to add components to the ER fluid of the present invention other than those listed above. Examples of such components include polymeric dispersants, surfactants, polymeric thickeners or the like, which are used to increase the dispersability of the inorganic/organic composite particles in the above-described medium to adjust the viscosity of the fluid at the time of the application of voltage, and to increase the shearing resistance.

Furthermore, the fluid in accordance with the present invention may be used in a mixture with conventional ER fluids in which solid particles comprising polymers or bridging materials of, for example, cellulose, starch, casein, polystyrene ion exchange resin, polyacrylate bridger, or aziridine compounds, are dispersed in an electrically insulating oil, such as, for example, silicone oil, diphenyl chloride, transformer oil, or the like, in so far as the characteristics of the ER fluid are not thereby lost.

In the electrorheological fluid according to the present invention, manufactured as described above, the solid particles which are dispersed in the electrically insulating medium are inorganic/organic composite particles, and these inorganic/organic composite particles have a shell comprising inorganic ion exchanger or silica gel or the like having strong ER effects, so that the ER fluid of the present invention which utilizes these particles exhibits high ER effects, and a large shearing resistance can be produced by means of even a low applied voltage.

In the inorganic/organic composite particles in accordance with the present invention, the core is comprising organic polymeric compound, so that it is possible to cause the specific gravity thereof to approach the specific gravity of the above-described electrically insulating medium, and by means of this, the precipitation of the particles can be prevented over long periods of time.

In addition, because the cores of these inorganic/organic composite particles are comprising organic polymeric compound, the particles as a whole are soft, even though these particles have shells which are comprising hard inorganic material, and such particles will not cause damage to electrodes or to instrument walls during use.

In the case in which nonaqueous inorganic ion exchanger is used as the ER inorganic material, the polarization of the inorganic/organic composite particles is not dependent on the water content thereof, so that even if the temperature of the system rises during use and the amount of water contained thus changes, it is possible to stably maintain the ER characteristics of the composition.

Furthermore, in the case in which a material possessing great conductivity is used as the ER inorganic material, as well, it is possible to adjust the weight ratio of the shell material with respect to the core material of the inorganic/organic composite particles, so that by means of this it is possible to adjust the conductivity, and thus to restrain abnormal heating and power consumption while the ER fluid is electrically charged.

In addition, in the ER fluid in accordance with the present invention, the surfaces of the inorganic/organic composite particles are polished, so that it is possible to maintain a highly effect without interfering with the activity of the ER inorganic material which forms the shells.

Furthermore, in a preferred form of the present invention, the inorganic/organic composite particles are manufactured by means of a method in which the core and the shells are formed simultaneously so that the bonding between the cores and the shells is strong, and the shells will not strip away from the core as a result of friction and the like during use, which would lead to changes in the characteristics, so that the durability of the particles is high.

In this way, the ER fluid in accordance with the present invention possesses superior ER effects and good stability, and will not damage instruments, so that it can be used effectively as a fluid for power transmission or braking which can be electrically controlled in instruments such as clutches, dampers, shock absorbers, valves, actuators, vibrators, printers, vibrating devices, or the like.

(EXAMPLES)

The present invention will be explained in greater detail by means of the examples given hereinbelow.

(Example 1)

A mixture of 20 g of titanium hydroxide (general term: titanium oxide dihydroxide, produced by Ishihara Sangyo Kaisha, Ltd., C-II), 300 g of butyl acrylate, 100 g of 1,3-butylene glycol dimethacrylate, and polymerization initiator was dispersed in 1800 ml of water containing 25 g of tertiary calcium phosphate as a dispersion stabilizer; this was agitated for a period of 1 hour at a temperature of 60° C. and suspension polymerization was conducted.

The product thus obtained was subjected to filtration, acid cleaning, water washing, and drying, and inorganic/organic composite particles (1-A) were obtained. The water content of these particles was measured at 0.50 wt % by means of Karl Fisher's titration method. Furthermore, the average particle diameter was 14.6 micrometers.

The inorganic/organic composite particles (1-A) which were thus obtained, were subjected to jetstream-blown agitation for a period of 5 minutes at 6000 rpm using a jet stream agitator (a hybridizer manufactured by Nara Machinery Co.,Ltd.), the surfaces thereof were thus polished, and inorganic/organic particles (1-B) were obtained. The water content of these particles was 0.46 wt %, and the average particle diameter thereof was 14.5 µm.

The inorganic/organic composite particles (1-A) and (1-B) were uniformly dispersed in silicone oil (produced by Toshiba Silicone Co., TSF451-1000) having a viscosity of 1 Pa.s at room temperature, so that the amount of particles obtained was 33 wt %, and the ER fluids of examples (1-A) and (1-B) were thus obtained.

These compositions were placed in a double-walled cylindrical rotational viscometer, a direct current voltage of 2 KV/mm was applied between the inner and outer cylinders at a temperature of 25° C., and a torque was applied to the inner cylinder electrode, and the shear stress (Pa) at various shear rate (s$^{-1}$), and current density (μA/cm$^2$) between the inner and outer cylinder at the time of the measurement of shear stress, were measured.

The results thereof are shown in Table 1.

TABLE 1

| | \multicolumn{6}{c}{SHEAR RATE (s$^{-1}$)} | | | | | |
|---|---|---|---|---|---|---|
| | 115 | 68.5 | 40.9 | 24.9 | 14.2 | 8.9 |
| Example 1-A | | | | | | |
| Shear Stress (Pa) | | | | | | |
| E = 0 | 435 | 269 | 158 | 103 | 67.2 | 45.1 |
| E = 2 KV/mm | 451 | 285 | 170 | 107 | 67.2 | 49.8 |
| Current density (μA/cm$^2$) | <5 | <5 | <5 | <5 | <5 | <5 |
| Example 1-B | | | | | | |
| Shear Stress (Pa) | | | | | | |
| E = 0 | 410 | 253 | 154 | 96.5 | 57.7 | 39.6 |
| E = 2 KV/mm | 467 | 356 | 308 | 277 | 245 | 225 |
| Current density (μA/cm$^2$) | <5 | <5 | <5 | <5 | <5 | <5 |

(Example 2)

The conditions of Example 2 were identical to those of Example 1 with the exception of the use of 40 g of titanium hydroxide in place of the 20 g of titanium hydroxide of Example 1; inorganic/organic composite particles (2-A), the surfaces of which were not polished, were obtained.

Such particles were then subjected to jetstream-blown agitation for periods of 1 minute, 5 minutes, and 10 minutes at 6000 rpm, with the exception of these, a process identical to that of Example 1 was carried out to produce 3 types of inorganic/organic composite particles (2-B), (2-C), and (2-D), the surfaces of which were polished. The various water contents and average particle diameters are shown in Table 2-1.

These inorganic/organic composite particles were uniformly dispersed in silicone oil following a procedure identical to that of Example 1 so as to produce the percentages contained which are shown in Table 2-2, and thus the ER fluids of Examples (2-A), (2-B), (2-C), and (2-D) were obtained.

The ER effects of these fluids were measured in a manner identical to that of Example 1.

The results thereof are shown in Table 2-2.

TABLE 2-1

| INORGANIC/ORGANIC COMPOSITE PARTICLES | 2-A | 2-B | 2-C | 2-D |
|---|---|---|---|---|
| WATER CONTENT (wt %) | 0.66 | 0.61 | 0.72 | 0.50 |
| AVERAGE PARTICLE DIAMETER (μm) | 17.3 | 16.0 | 17.3 | 17.5 |

TABLE 2-2

| | \multicolumn{6}{c}{SHEAR RATE (s$^{-1}$)} | | | | | |
|---|---|---|---|---|---|---|
| | 115 | 68.5 | 40.9 | 24.9 | 14.2 | 8.9 |
| Example 2-A % Content 32 wt % | | | | | | |
| Shear Stress (Pa) | | | | | | |
| E = 0 | 357 | 219 | 135 | 81.8 | 52.1 | 31.5 |
| E = 2 KV/mm | 392 | 243 | 154 | 96.7 | 64.5 | 42.7 |
| Current density (μA/cm$^2$) | <5 | <5 | <5 | <5 | <5 | <5 |
| Example 2-B % Content 33 wt % | | | | | | |
| Shear Stress (Pa) | | | | | | |
| E = 0 | 357 | 218 | 131 | 79.4 | 45.9 | 29.8 |
| E = 2 KV/mm | 905 | 670 | 533 | 434 | 360 | 300 |
| Current density (μA/cm$^2$) | <5 | <5 | <5 | <5 | <5 | <5 |
| Example 2-C % Content 31 wt % | | | | | | |
| Shear Stress (Pa) | | | | | | |
| E = 0 | 315 | 191 | 114 | 70.7 | 39.7 | 26.0 |
| E = 2 KV/mm | 578 | 496 | 382 | 293 | 231 | 188 |
| Current density (μA/cm$^2$) | <5 | <5 | <5 | <5 | <5 | <5 |
| Example 2-D % Content 33 wt % | | | | | | |
| Shear Stress (Pa) | | | | | | |
| E = 0 | 355 | 213 | 129 | 78.1 | 44.6 | 28.5 |
| E = 2 KV/mm | 476 | 397 | 340 | 288 | 238 | 196 |
| Current density (μA/cm$^2$) | <5 | <5 | <5 | <5 | <5 | <5 |

(Example 3)

A process identical to that of Example 1, with the exception that 80 g of titanium hydroxide was used in place of the 20 g of titanium hydroxide which was used in Example 1, was followed, and inorganic/organic composite particles (3-A), the surfaces of which were unpolished, were obtained. The water content of these particles was 1.53 wt %, and the average particle diameter was 13.6 μm.

These were then subjected to jetstream-blown agitation in a manner identical to that of Example 1, and inorganic/organic composite particles (3-B), the surfaces of which were polished, were obtained. The water content of these particles was 0.67 wt %, and the average particle diameter was 13.7 μm.

These particles were dispersed in silicone oil in a manner identical to that of Example 1 so that the percentage contained thereof was 33 wt %, and the ER fluids of Examples (3-A) and (3-B) were obtained.

The ER effects of these fluids were measured in a manner identical to that of Example 1.

The results thereof are shown in Table 3.

TABLE 3

| | \multicolumn{6}{c|}{SHEAR RATE ($s^{-1}$)} | | | | | |
|---|---|---|---|---|---|---|
| | 115 | 68.5 | 40.9 | 24.9 | 14.2 | 8.9 |
| Example 3-A | | | | | | |
| Shear Stress (Pa) | | | | | | |
| E = 0 | 403 | 249 | 158 | 103 | 71.2 | 47.5 |
| E = 2 KV/mm | 427 | 269 | 174 | 119 | 83.1 | 63.3 |
| Current density ($\mu A/cm^2$) | <5 | <5 | <5 | <5 | <5 | <5 |
| Example 3-B | | | | | | |
| Shear Stress (Pa) | | | | | | |
| E = 0 | 403 | 245 | 150 | 94.9 | 59.3 | 37.1 |
| E = 2 KV/mm | 728 | 566 | 447 | 360 | 293 | 249 |
| Current density ($\mu A/cm^2$) | <5 | <5 | <5 | <5 | <5 | <5 |
| Comparative Example 3a | | | | | | |
| Shear Stress (Pa) | | | | | | |
| E = 0 | \multicolumn{6}{l|}{A large current was caused to flow when voltage} | | | | | |
| E = 2 KV/mm | \multicolumn{6}{l|}{was applied, so that measurement was impossible} | | | | | |
| Current density ($\mu A/cm^2$) | | | | | | |
| Comparative Example 3b | | | | | | |
| Shear Stress (Pa) | | | | | | |
| E = 0 | 150 | 93.9 | 57.7 | 39.6 | <30 | <30 |
| E = 2 KV/mm | 158 | 99.7 | 67.2 | 47.5 | <30 | <30 |
| Current density ($\mu A/cm^2$) | <5 | <5 | <5 | <5 | <5 | <5 |

(Comparative Examples 3a and 3b)

In place of the inorganic/organic composite particles (3-A) of Example 3, a powder consisting solely of titanium hydroxide was dispersed uniformly in silicone oil so as to reach a percentage contained of 33 wt %, and the fluid of Comparative Example 3a was thus obtained. An attempt was made to measure the ER effects of the composition thus obtained in a manner identical to that of Example 1; however, as a large current was caused to flow in this composition, the desired applied voltage could not be reached, and thus measurement of the shear stress proved to be impossible.

Furthermore, a powder consisting solely of titanium hydroxide was dispersed in silicone oil so that the percentage of the powder contained in the fluid was identical to the percentage contained in Example (3-A) (5.5 wt %), and the fluid of Comparative Example 3b was thus obtained. The ER effects of Comparative Example 3b were measured in a manner identical to that of Example 1, and these results are shown in Table 3 for the purpose of comparison with Example 3.

(Example 4)

A process was followed which was identical to that of Example 1, with the exception that 120 g of titanium hydroxide was used in place of the 20 g of titanium hydroxide which was used in Example 1, and inorganic/organic composite particles (4-A), the surfaces of which were unpolished, were obtained. The percentage contained of these particles was 1.93 wt %, and the average particle diameter thereof was 14.4 μm.

Next, these particles were subjected to jetstream-blown agitation in a manner identical to that of Example 1, and inorganic/organic composite particles (4-B), the surfaces of which were unpolished, were obtained. The water content of these particles was 0.74 wt %, and the average particle diameter was 13.2 μm.

These particles were dispersed uniformly in silicone oil in a manner identical to that of Example 1 so that the percentage thereof contained was 33 wt %, and the ER fluids of Examples (4-A) and (4-B) were obtained.

The ER effects of these fluids were measured in a manner identical to that of Example 1.

The results thereof are shown in Table 4.

TABLE 4

| | \multicolumn{6}{c|}{SHEAR RATE ($s^{-1}$)} | | | | | |
|---|---|---|---|---|---|---|
| | 115 | 68.5 | 40.9 | 24.9 | 14.2 | 8.9 |
| Example 4-A | | | | | | |
| Shear Stress (Pa) | | | | | | |
| E = 0 | 431 | 267 | 166 | 104 | 63.3 | 43.5 |
| E = 2 KV/mm | 471 | 301 | 198 | 134 | 98.9 | 79.0 |
| Current density ($\mu A/cm^2$) | <5 | <5 | <5 | <5 | <5 | <5 |
| Example 4-B | | | | | | |
| Shear Stress (Pa) | | | | | | |
| E = 0 | 384 | 229 | 140 | 84.6 | 49.8 | 31.6 |
| E = 2 KV/mm | 646 | 483 | 376 | 300 | 253 | 214 |
| Current density ($\mu A/cm^2$) | <5 | <5 | <5 | <5 | <5 | <5 |

(Example 5)

A method was used which was identical to that of Example 1, with the exception that 80 g of silica gel (Esquartz M-4005), manufactured by Nippon Steel Chemical Co.,Ltd.) having an average particle diameter of 0.04 micrometers was used in place of the 20 g of titanium hydroxide which was used in Example 1, and inorganic/organic composite particles (5-A), the surfaces of which were unpolished, were obtained. The water content of these particles was 0.95 wt %, and the average particle diameter was 14.4 μm.

Next, these particles were subjected to jet stream blown agitation in a manner identical to that of Example 1, and inorganic/organic composite particles (5-B), the surfaces of which were polished, were obtained. The water content of these particles was 0.91 wt %, and the average particle diameter was 13.5 μm.

The inorganic/organic composite particles (5-B) having polished surfaces, and the inorganic/organic composite particles (5-A) having unpolished surfaces were uniformly dispersed in silicone oil so that the percentage thereof contained reached 33 wt %, and thus the ER fluids of Example 5 and Comparative Example 5 were obtained.

The ER effects of these ER fluids were measured in a manner identical to that of Example 1.

The results thereof are shown in Table 5.

TABLE 5

| | SHEAR RATE (s⁻¹) | | | | | |
|---|---|---|---|---|---|---|
| | 115 | 68.5 | 40.9 | 24.9 | 14.2 | 8.9 |
| Example 5-B | | | | | | |
| Shear Stress (Pa) | | | | | | |
| E = 0 | 399 | 245 | 146 | 91.0 | 55.4 | 39.6 |
| E = 2 KV/mm | 423 | 273 | 194 | 162 | 150 | 138 |
| Current density ($\mu A/cm^2$) | <10 | <10 | <10 | <10 | <10 | <10 |
| Comparative Example 5-A | | | | | | |
| Shear Stress (Pa) | | | | | | |
| E = 0 | 494 | 305 | 194 | 123 | 83.1 | 59.3 |
| E = 2 KV/mm | 514 | 323 | 214 | 146 | 103 | 75.1 |
| Current density ($\mu A/cm^2$) | <10 | <10 | <10 | <10 | <10 | <10 |

(Example 6)

A procedure was conducted which was identical to that of Example 1, with the exception that 80 of niobium hydroxide (niobium hydroxide manufactured by Mitsui Mining & Smelting Co.,Ltd.) was used in place of the 20 g of titanium hydroxide which was used in Example 1, and the inorganic/organic composite particles (6-A), the surfaces of which were unpolished, were obtained. The water content of these particles was 1.86 wt %, and the average particle diameter was 15.7 μm.

Next, these particles were subjected to jetstream-blown agitation in a manner identical to that of Example 1, and inorganic/organic composite particles (6-B), the surfaces of which were polished, were obtained. The water content of these particles was 1.10 wt %, and the average particle diameter was 15.4 μm.

These particles were uniformly dispersed in silicone oil by means of a method identical to that of Example 1 so as to reach a percentage thereof contained of 33 wt %, and the ER fluids of Examples (6-A) and (6-B) were thus obtained.

The ER effects of these fluids were measured in a manner identical to that of Example 1.

The results thereof are shown in Table 6.

TABLE 6

| | SHEAR RATE (s⁻¹) | | | | | |
|---|---|---|---|---|---|---|
| | 115 | 68.5 | 40.9 | 24.9 | 14.2 | 8.9 |
| Example 6-A | | | | | | |
| Shear Stress (Pa) | | | | | | |
| E = 0 | 452 | 290 | 186 | 127 | 80.7 | 55.4 |
| E = 2 KV/mm | 463 | 290 | 190 | 131 | 91.0 | 63.3 |
| Current density ($\mu A/cm^2$) | <5 | <5 | <5 | <5 | <5 | <5 |
| Comparative Example 6-B | | | | | | |
| Shear Stress (Pa) | | | | | | |
| E = 0 | 414 | 259 | 164 | 108 | 72.8 | 51.4 |
| E = 2 KV/mm | 430 | 281 | 206 | 174 | 154 | 134 |

TABLE 6-continued

| | SHEAR RATE (s⁻¹) | | | | | |
|---|---|---|---|---|---|---|
| | 115 | 68.5 | 40.9 | 24.9 | 14.2 | 8.9 |
| Current density ($\mu A/cm^2$) | <5 | <5 | <5 | <5 | <5 | <5 |

(Example 7)

The ER fluid of Example (3-B) was placed in a tightly sealed transparent vessel, this was stored at room temperature, and the sedimentation state thereof was visually evaluated. The results thereof are shown in Table 7.

(Comparative Example 7)

The sedimentation state of the fluid of Comparative Example (3b) was evaluated in a manner identical to that of the above Example 7. The results thereof are shown in Table 7.

TABLE 7

| | After 1 Day | After 3 Days | After 3 Weeks |
|---|---|---|---|
| Example 7 | O | O | O |
| Comparative Example 7 | O | X | X |

O: Sedimentation was not observed
X: Sedimentation was observed (Example 8)

A reciprocating motion, level surface abrasion test was conducted in accordance with JIS H8682 (testing method for resistance to abrasion of the layer subject to anodic oxidation of aluminum and aluminum alloy), using the ER fluid of Example (3-B) as the subject thereof. That is to say, on an aluminum plate in accordance with JIS H4000 A1050P, in place of a friction ring, a 4 cm² friction sliding device having placed thereon 10 sheets of gauze on which 1 g of the fluid was placed, was moved back and forth for 10 strokes under a load of 55 gw/cm², and the state of the surface of the aluminum plate was visually evaluated.

The results thereof are shown in Table 8.

(Comparative Example 8)

A reciprocal motion, level surface abrasion test was conducted with respect to the fluid of Comparative Example 3a in a manner identical to that of Example 8.

The results thereof are shown in Table 8 for the purposes of comparison with Example 8.

TABLE 8

| | State of Aluminum Plate Surface |
|---|---|
| Example 8 | O |
| Comparative Example 8 | X |

O: No change (evidence of damage was not observed).
X: Multiple traces of damage were observed.

(Example 9)

The surface atomic ratio of carbon, oxygen, and titanium atoms of the inorganic/organic composite particles (2-A)

having unpolished surfaces and the inorganic/organic composite particles (2-C) having polished surfaces which were obtained in Example 2 were measured (the measurement conditions were such that the excitation source was Mg(Kα), and the output was 260 W) in a high resolution X-ray photoelectron spectrograph (ESCLAB MKII, manufactured by the VG Scientific Co. of England). The measurement results of the composite particles (2-A) having unpolished surfaces are shown in Table 9 as Example (9-A), while the measurement results of the composite particles (2-C) having polished surfaces are shown in Table 9 as Example (9-B).

TABLE 9

| | Inorganic/Organic Composite Particles | Carbon Atoms (%) | Oxygen Atoms (%) | Titanium Atoms (%) |
|---|---|---|---|---|
| Example 9-A | (2-A) | 64.83 | 28.27 | 6.90 |
| Example 9-B | (2-C) | 47.06 | 39.49 | 13.46 |

The surface atomic ratios of carbon, oxygen, and silicon atoms of the inorganic/organic composite particles (5-A) having unpolished surfaces and the inorganic/organic composite particles (5-B) having polished surfaces which were obtained in Example 5 were measured in a manner identical to that of Example 9, and the measurement results of composite particles (5-B) are shown in Table 10 as Example 10, while the measurement results of composite particles (5-A) are shown in Table 10 as Comparative Example 10.

TABLE 10

| | Inorganic/Organic Composite Particles | Carbon Atoms (%) | Oxygen Atoms (%) | Silicon Atoms (%) |
|---|---|---|---|---|
| Example 10 | (5-B) | 31.24 | 41.77 | 26.99 |
| Comparative Example 10 | (5-A) | 48.84 | 35.93 | 15.23 |

From the results of Table 9, it can be seen that in comparison with the inorganic/organic composite particles (2-A) which were not subjected to jetstream-blown agitation, the inorganic/organic composite particles (2-C) for which jetstream-blown agitation was conducted, had a surface carbon atom ratio which was small, while the titanium atom ratio was large. This corresponds to the fact that, as can be seen in Table 2, the ER fluid utilizing the inorganic/organic composite particles (2-C) which were subjected to jetstream-blown agitation exhibits ER effects which are greater than those of the ER fluid which utilized the inorganic/organic composite particles (2-A) which were unpolished.

An identical trend can be observed in Table 10 as well; the inorganic/organic composite particles (5-B) which were subjected to jetstream-blown agitation, have a surface carbon atom ratio which is small, while the silicon atom ratio is large. This corresponds to the fact that, as can be seen in Table 5, the ER fluid of the present invention (Example 5) exhibits ER effects which are greater than those of the fluid which utilized the unpolished particles (Comparative Example 5).

From the above-described results, it can be concluded that in the inorganic/organic composite particles shown in the above Examples 1-6 which were produced by means of a method in which the core and the shell were simultaneously formed, there is the possibility that a part of the shell will be covered by a thin film of core material or an additive material such as dispersant or emulsifier, and that by means of the removal of this layer covering the shell using friction polishing by means of jetstream-blown agitation, the effective active surface of the inorganic solid particle layer is increased, so that when such particles are used in ER fluids, greater ER effects are exhibited.

From the above results, it is clear that the ER fluids which are examples in accordance with the present invention, all possess superior ER effects and thermal resistance when compared with the Comparative Examples, possess stability, will not damage instrumentation, and have a small power consumption.

What is claimed is:

1. An electrorheological fluid, comprising composite particles dispersed in an electrically insulating medium,
   wherein said composite particles consist essentially of a core consisting essentially of an electrically insulating organic polymeric compound and a single shell consisting essentially of microparticles of an inorganic material having electrorheological effects, and
   wherein the inorganic material having electrorheological effects is at least one inorganic ion exchanger selected from the group consisting of hydroxides of polyvalent metals, hydroxyapatites, Nasicon compounds, clay minerals, potassium titanates, heteropoly-acid salts and insoluble ferrocyanides.

2. An electrorheological fluid as in claim 1, wherein said composite particles are produced by a method in which said core and said shell are formed simultaneously by using one of emulsion polymerization, suspension polymerization, and dispersion polymerization in the presence of inorganic microparticles having electrorheological effects.

3. An electrorheological fluid as in claim 1, wherein said Nasicon compounds include $NaZr_2(PO_4)_3$ and $(H_3O)Zr_2(PO_4)_3$.

4. An electroheological fluid as in claim 1, wherein said electrically insulating organic compound is at least one compound selected from the group consisting of poly(meth)acrylic ester, (meth)acrylic esterstyrene copolymer, polystyrene, polyethylene, polypropylene, nitrile rubber, butyl rubber, ABS resin, nylon, polyvinyl butylate, ionomer, ethylene-vinyl acetate copolymer, vinyl acetate resin, and polycarbonate resin.

5. An electrorheological fluid, comprising composite particles dispersed in an electrically insulating medium,
   wherein said composite particles consist essentially of a core consisting essentially of an electrically insulating organic polymeric compound and a single shell consisting essentially of microparticles of an inorganic material having electrorheological effects, and
   wherein the inorganic material having electrorheological effects at least one inorganic ion exchanger selected from the group consisting of hydroxides of polyvalent metals, hydroxyapatites, Nasicon compounds, clay minerals, potassium titanates, heteropoly-acid salts and insoluble ferrocyanides, and
   further wherein said composite particles have a polished surface.

6. An electrorheological fluid as in claim 5, wherein said polishing is conducted by means of jetstream-blown agitation.

7. An electrorheological fluid as in claim 5, wherein said composite particles are produced by a method in which said core and said shell are formed simultaneously by using one of emulsion polymerization, suspension polymerization, and dispersion polymerization in the presence of inorganic microparticles having electrorheological effects.

8. An electrorheological fluid as in claim 5, wherein said Nasicon compounds include $NaZr_2(PO_4)_3$ and $(H_3O)Zr_2(PO_4)_3$.

9. An electroheological fluid as in claim 5, wherein said electrically insulating organic compound is at least one compound selected from the group consisting of poly(meth) acrylic ester, (meth)acrylic esterstyrene copolymer, polystyrene, polyethylene, polypropylene, nitrile rubber, butyl rubber, ABS resin, nylon, polyvinyl butylate, ionomer, ethylene-vinyl acetate copolymer, vinyl acetate resin, and polycarbonate resin.

* * * * *